Dec. 13, 1966  F. SAMET  3,290,949
FLEXURAL PIVOT
Filed Dec. 18, 1963

FRANK SAMET
*INVENTOR.*

BY
*Thomas W. Kennedy*
ATTORNEY

United States Patent Office 3,290,949
Patented Dec. 13, 1966

3,290,949
FLEXURAL PIVOT
Frank Samet, New York, N.Y., assignor to General Precision Inc., Little Falls, N.J., a corporation of Delaware
Filed Dec. 18, 1963, Ser. No. 331,613
6 Claims. (Cl. 74—5)

The present invention relates to precision instruments having one part supported for pivotal displacement relative to another part by spaced flexure members of the type referred to as "Hooke's joints."

In certain precision instruments of the class including single-degree-of-freedom gyroscopes, single-axis pendulous accelerometers, galvanometers, and the like, there is a sensing element or floating body which is pivotally supported at spaced points by flexure pivot members. Each flexure member has a transverse segment of reduced cross-section, defining an axis of flexure; usually two such members are used and arranged with their respective axes aligned to permit limited angular displacement of the supported body, relative to a supporting structure, the axis of rotation being defined by the aligned axes of flexure. Each flexure member is fixedly connected at one of its ends to the supported body and at its opposite end to the supporting structure. With this arrangement, the flexure members are preferably parallel to each other, i.e., with their longitudinal axes at right angles to the axis of rotation.

When a temperature difference exists between the supported body and the supporting structure, or when both are subject to some abnormal temperature and have different coefficients of expansion, the spacing between the corresponding fixed ends of the flexure members connected to the supported body is substantially different than that between the ends fixed to the supporting body. Such a difference in the spacings causes a bending at one or both of said flexure members in an *axial* direction, that is, particularly in a plane through the longitudinal axes of said flexure members and the axis of rotation. In this way, one or both flexure members may be subjected to undue bending stresses, resulting in failure, or a shortened service life. In addition, such a differential in expansion between the supported body and the supporting structure of a sensitive instrument may cause a radial shifting of the axis of rotation of the supported body so that it is not fixed in relation to the supporting structure; this condition causes instrument errors.

The problem of temperature-differential-induced bending stresses in flexure joints has proved particularly troublesome in floated rate gyros where it is caused by heat generated by the spin motor contained in the float. Accordingly, the invention is described herein with particular reference to its application to floated gyros.

In accordance with one embodiment of the present invention, in the case of a floated rate gyroscope, one of its pair of flexural pivot members is provided with additional transverse segments of reduced cross-section, spaced along the length of the flexure member. The additional segments of reduced cross-section have axes of flexure substantially parallel to each other and perpendicular to a plane including the axis of rotation and the longitudinal axis of said flexure member. A flexure member of this improved construction is subject to a greatly reduced bending stress; specifically, the bending stress is an insignificant fraction of that which would normally occur in a comparable conventional flexure member under comparable service conditions.

Accordingly, it is one object of the invention to minimize unwanted bending stresses in a fixed-ended flexural pivot member caused by secondary bending moments other than the primary bending moment about the pivot axis of said pivot member.

It is another object of the invention to provide a flexural pivot system for a rate gyroscope, the inner gimbal and outer casing of which are subject to a difference in axial expansion under temperature.

It is a further object of the invention to provide a pair of flexure members for interconnecting two separate bodies, for pivoting one body relative to the other body about an axis of rotation fixed in relation to each body, and for allowing a limited translation of one body relative to the other body in a direction substantially parallel to said axis of rotation.

Further objects and advantages of the present invention will become readily apparent as the following detailed description of a specific embodiment of the invention is read in conjunction with the annexed drawings, wherein like parts are designated by like reference numerals throughout the several views, and:

Figure 1:
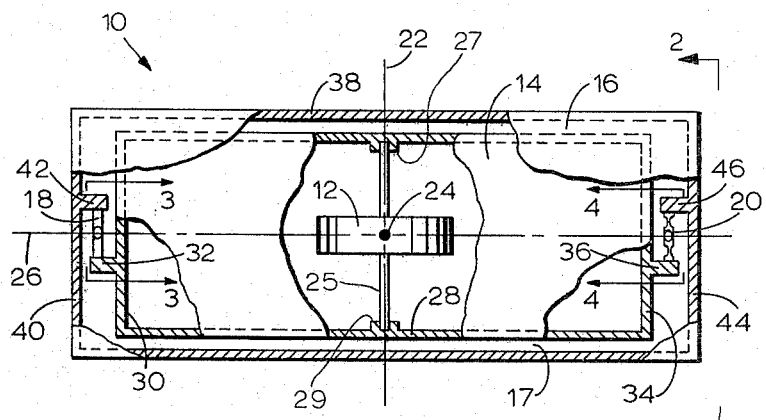
FIGURE 1 is a schematic sectional view of a rate gyroscope.
Figure 2:
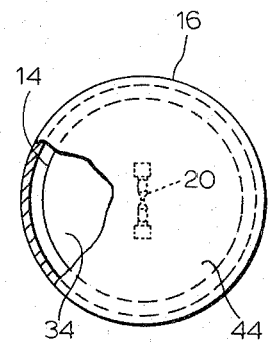
FIGURE 2 is a view on line 2—2 of FIGURE 1.

Referring to FIGURE 1, the invention is shown embodied in a gyroscope 10, having a rotor 12 which is rotatably mounted in an inner gimbal 14. Inner gimbal 14 is pivotally mounted for limited angular displacement in an outer gimbal or case 16. Between the outer surface of inner gimbal 14 and the inner surface of outer gimbal 16 is provided a gap 17, which is preferably filled with damping fluid. In the illustrated embodiment, gyro 10 is of the floated type and, therefore, outer gimbal 16 is a fluid-tight housing and inner gimbal 14 is a float buoyantly supported by flotation fluid filling the space 17 between the float and housing. In accordance with the present invention, the sole mechanical connection between inner gimbal 14 and outer gimbal 16 is by means of a pair of flexure members or bars 18, 20.

Gyro 10, as illustrated in FIGURE 1, has three axes in quadrature: a spin axis 22, about which the rotor rotates; an output or precession axis 26 which is at right angles to spin axis 22, the output axis 26 being the axis of rotation of inner gimbal 14 relative to outer gimbal 16; and an input sensitive axis 24 disposed at right angles to the plane defined by the spin axis and output axis.

Rotor 12, which is driven by a motor (not shown), has a shaft 25 journaled at each end in suitable bearings 27, 29 for high speed rotation.

Inner gimbal 14 is preferably a fluid-tight, hollow, cylindrical body, having a peripheral wall 28 and a pair of end walls 30, 34. End walls 30, 34 have respective integral mounting bosses 32 and 36 on their outer faces having radially-inner faces fixedly connected to flexure members 18 and 20, respectively.

Outer gimbal or case 16 is also a fluid-tight, hollow, cylindrical member comprising a peripheral wall 38 and end walls 40, 44. Outer case end walls 40 and 42 have respective integral mounting bosses 42 and 46 on their axially-inner faces having radially-inner faces fixedly connected to flexure members 18 and 20, respectively. Gap 17 between gimbal 14 and case 16 is filled with a fluid which has a particular viscosity chosen to provide optimum damping. A bellows (not shown) may be provided to compensate for changes in volume of the damping fluid. The fluid has a buoyancy effect on inner gimbal 14 minimizing the stress in flexure members 18, 20 due to the weight of the gimbal and its contents which as previously mentioned, usually include the spin motor (not shown) as well as rotor 12.

Figure 3:
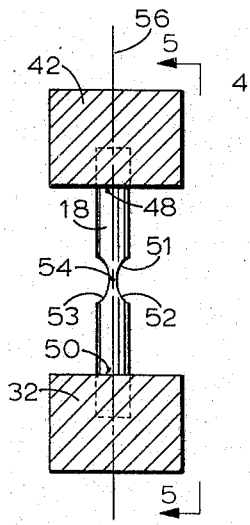
FIGURE 3 is a sectional view on line 3—3 of FIGURE 1.
Figure 5:
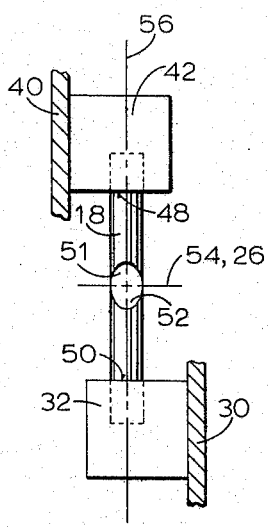
FIGURE 5 is a sectional view on line 5—5 of FIGURE 3.

Flexure member 18 is preferably an elongated, round bar of constant diameter, having end portions 48, 50, which are fixedly mounted in bosses 42, 32, respectively, preferably by being partly embedded in suitable recesses therein. As best appears in FIGURES 3 and 5, flexure member 18 has a longitudinal axis 56 and has a pair of transverse, arcuate recesses 52, 53 on opposite sides coacting to produce a segment 51 of reduced cross-section intermediate end portions 48, 50. Recesses 52, 53 have concave inner surfaces, preferably arcuate in profile and of equal radii, symmetrically disposed with respect to the longitudinal axis 56. In consequence, segment 51 is symmetrical about axis 56 and has a flexural axis 54, which is defined by the locus of the thinnest section of segment 51 and which coincides with axis 26 (FIGURE 1).

Flexure member 20 is preferably also an elongated bar, of circular cross-section and constant diameter, having end portions 58, 60 which are fixedly mounted in bosses 46, 36, respectively, preferably by being partly embedded in suitable recesses therein. Flexure member 20 has a longitudinal axis 59 and a pair of transverse recesses 62, 63 on opposite sides coacting to form a segment 61 of reduced cross-section intermediate end portions 58, 60. Recesses 62, 63 have concave inner surfaces, preferably arcuate in profile and of equal radii, symmetrically disposed about the bar axis 59. In consequence, segment 61 is symmetrical with respect to axis 59 and has a flexural axis 64 defined by the thinnest portion of said segment 61 and coinciding with axis 26.

Figures 4, 6:
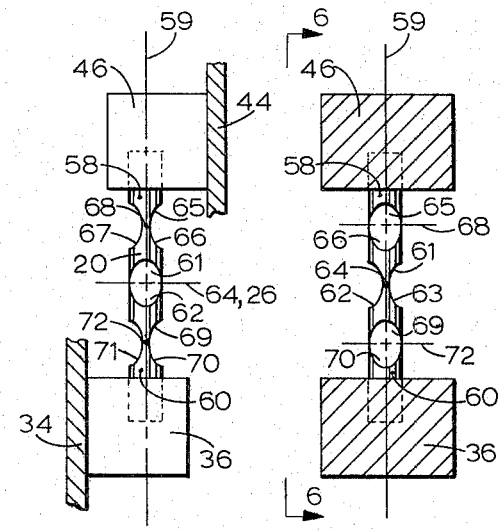
FIGURE 4 is a sectional view on line 4—4 of FIGURE 1.
FIGURE 6 is a sectional view on line 6—6 of FIGURE 4.

Flexure member 20 has two additional segments 65, 69 of reduced cross-section preferably conforming in configuration to, and disposed on opposite sides of flexure segment 61. As illustrated in FIGURE 6, flexure segment 65 is formed by and between a pair of recesses 66, 67 and flexure segment 69 by and between recesses 70, 71. Segments 65, 69 define, at their thinnest sections, parallel flexure axes 68, 72, respectively, disposed transverse to longitudinal axis 59.

Flexure axes 68, 72 in flexure member 20 are disposed in the plane including longitudinal axis 59, the plane being substantially at right angles to flexure axis 64 and precession axis 26. Flexure axes 68, 72 are also preferably axially spaced an equal distance on each side of flexure axis 64 of flexure member 20. The respective compliances of segments 65 and 69 about axes 68 and 72 are alike as are the compliances of segments 51 and 61 about axes 54 and 64. Thus, inner case 14 can pivot relative to outer case 16 about output axis 26, by pivoting about transverse axes 54 and 64. Upon the occurrence of the aforementioned differential axial expansion of inner gimbal 14 relative to outer case 16, the greater rigidity of flexure member 18, as compared to flexure member 20, in a direction parallel to axis 26, causes the spacing between end walls 30 and 40 to remain substantially unchanged while the spacing between end walls 34 and 44 will be greatly reduced. However, the construction of flexure member 20 permits its fixed end 60 to be translated in a direction parallel to output axis 26, relative to its other fixed end 58, so that nearly all of the differential axial expansion of members 14 and 16 can be absorbed by member 20 without unduly stressing its pivot segment 61. Moreover, since end portions 58 and 60 of member 20 can be offset in an axial direction in this manner, transverse axis 64 can maintain its normal relation to output axis 26 and still intersect output axis 26 approximately at a point on the longitudinal axis 59 of member 20, so that the axial alignment of inner gimbal 14 and outer case 16 is not disturbed.

In order to further minimize the bending stresses in the flexural members 18, 20 in accordance with the invention, the flexure members 18, 20 may be slightly preflexed and prestressed when assembled between the movable member or inner gimbal 14 and the supporting structure or outer gimbal 16, the assembly being made during the shutdown or cold condition of the gyroscope 10. In such a construction, flexure member 20 is preferably prestressed and preflexed in a plane including the longitudinal axis 59 of said member 20 and the rotational axis 26 of the bodies 14, 16 so that the portion of said longitudinal axis 59 adjacent one fixed end portion 58 of said flexure member 20 is offset in a direction parallel to said axis of rotation 26 relative to the portion of said longitudinal axis adjacent the opposite fixed end portion 60 of said flexure member 20. Said offset in member 20 is preferably equal to the approximate total differential axial dimensional change or expansion between said bodies 14, 16, caused by the relative expected temperature difference between said bodies 14, 16 during the operating or hot condition. The offset in member 20 is arranged so that during the operating condition, the longitudinal axes 56, 59 of flexure members 18, 20 will be approximately straight lines and parallel to each other, and members 18, 20 will be substantially unflexed in the reference plane through axes 26, 56 and 59. Thus, the bending stresses in said flexural members 18, 20 can be minimized during the operating condition of the instrument or gyroscope 10, the operating condition being oftentimes most critical due to increased vibration loading and other environmental changes.

It will be understood that the present invention may be applied to a wide variety of non-gyroscopic instruments or other devices where low-restraint, limited angular displacement is required. For example, flexure members 18 and 20 can be substituted for those shown in the single-axis, pendulous accelerometer described and claimed in U.S. Patent No. 2,985,021.

While I have described my invention in more detail in its present preferred embodiment, it will be obvious to those skilled in the art after understanding my invention that various changes and modifications may be made therein without departing from the spirit or scope thereof.

What is claimed is:
1. In a precision instrument:
   a movable member;
   a support structure; and
   means supportively connecting said member to said structure for limited angular displacement about an axis fixed with respect to said member and structure, said means constituting the sole mechanical connection between said member and structure and comprising:
      a pair of one piece flexure bars, each having its longitudinal axis disposed transversely to said fixed axis and having one end portion fixedly connected to said member and an opposite end portion fixedly connected to said structure, each said flexure bar having a segment of reduced cross-section defining an axis of flexure transverse to its longitudinal axis and substantially coincident with said fixed axis, at least one of said flexure bars having second and third segments of reduced cross-section, spaced along the length of the bar, defining respective second and third axes of flexure, parallel to each other, and disposed substantially at right angles to a plane including the longitudinal axis of said bar and said fixed axis.

2. In an instrument according to claim 1, said second and third segments of reduced cross-section being disposed on opposite sides of said first segment of reduced cross-section of said flexure bar.

3. In an instrument according to claim 1, said member being an inner gimbal of a gyroscope, said supporting structure being an outer supporting gimbal of the gyroscope.

4. In an instrument according to claim 1, said supporting structure being a fluid-tight housing of a floated gyroscope, said movable member being the gyroscope float and disposed, with substantial clearance, in said housing, said clearance spacing being adapted to contain a body of fluid for exerting buoyancy and motion-damping forces on the float.

5. In an instrument according to claim 1, the flexure bar having three segments of reduced cross-section being prestressed and preflexed in a plane including the longitudinal axis of the flexure bar and said fixed axis; a portion of longitudinal axis of said one bar adjacent one fixed end thereof being offset in a direction parallel to said fixed axis relative to the portion of said longitudinal axis adjacent the opposite fixed end of said bar, said offset being substantially equal to the total differential axial dimensional change between said member and structure caused by a relative temperature difference therebetween during operation.

6. An instrument as claimed in claim 1, and in which said flexure members are round bars of equal length and equal diameter, each of said segments being formed by a pair of opposite arcuate recesses, the surface of each said recess being cylindrical and having equal radii and centers of curvature on opposite sides of, at equal distances from, and in a plane substantially perpendicular to, the longitudinal axis of its respective flexure bar.

References Cited by the Examiner

UNITED STATES PATENTS

| | | | |
|---|---|---|---|
| 2,909,064 | 10/1959 | Schoeppel et al. | 74—5 |
| 3,009,360 | 11/1961 | Morsewich | 74—5 |
| 3,077,783 | 2/1963 | Stiles et al. | 73—517 |

FRED C. MATTERN, JR., *Primary Examiner.*

MILTON KAUFMAN, *Examiner.*

J. D. PUFFER, *Assistant Examiner.*